United States Patent Office 3,339,280
Patented Sept. 5, 1967

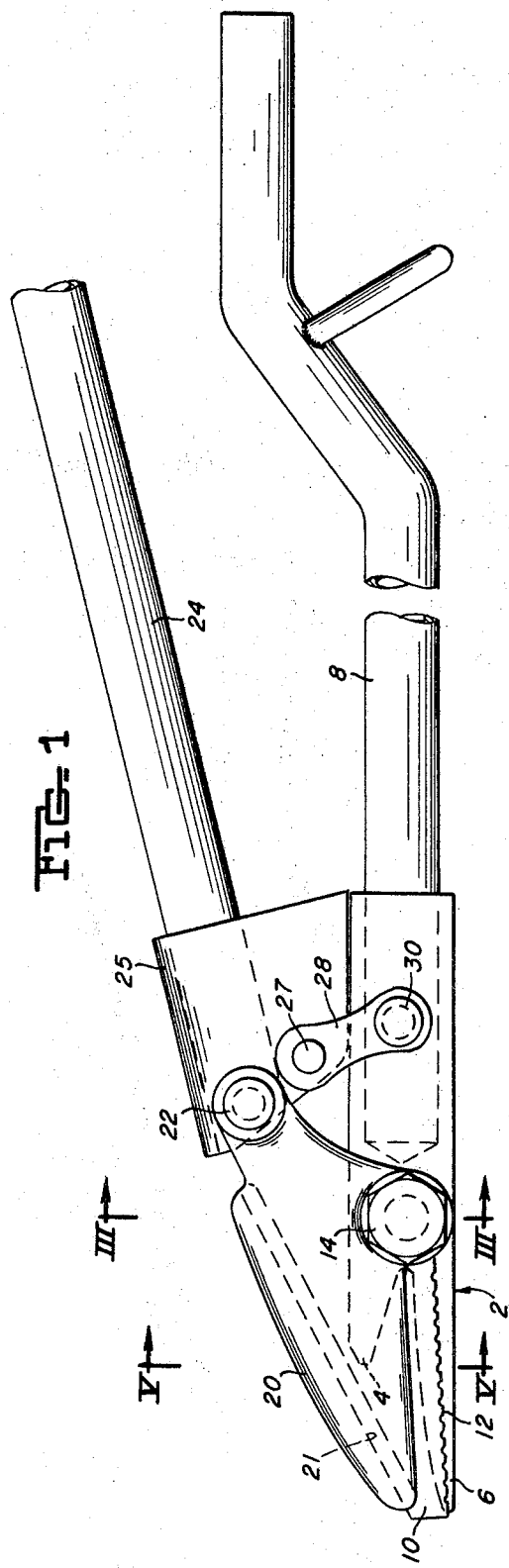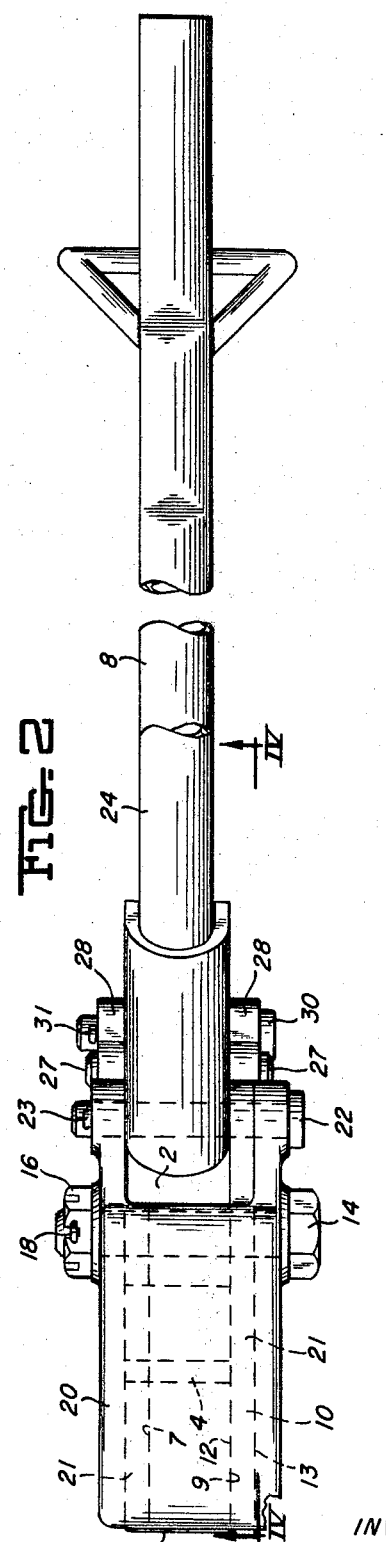

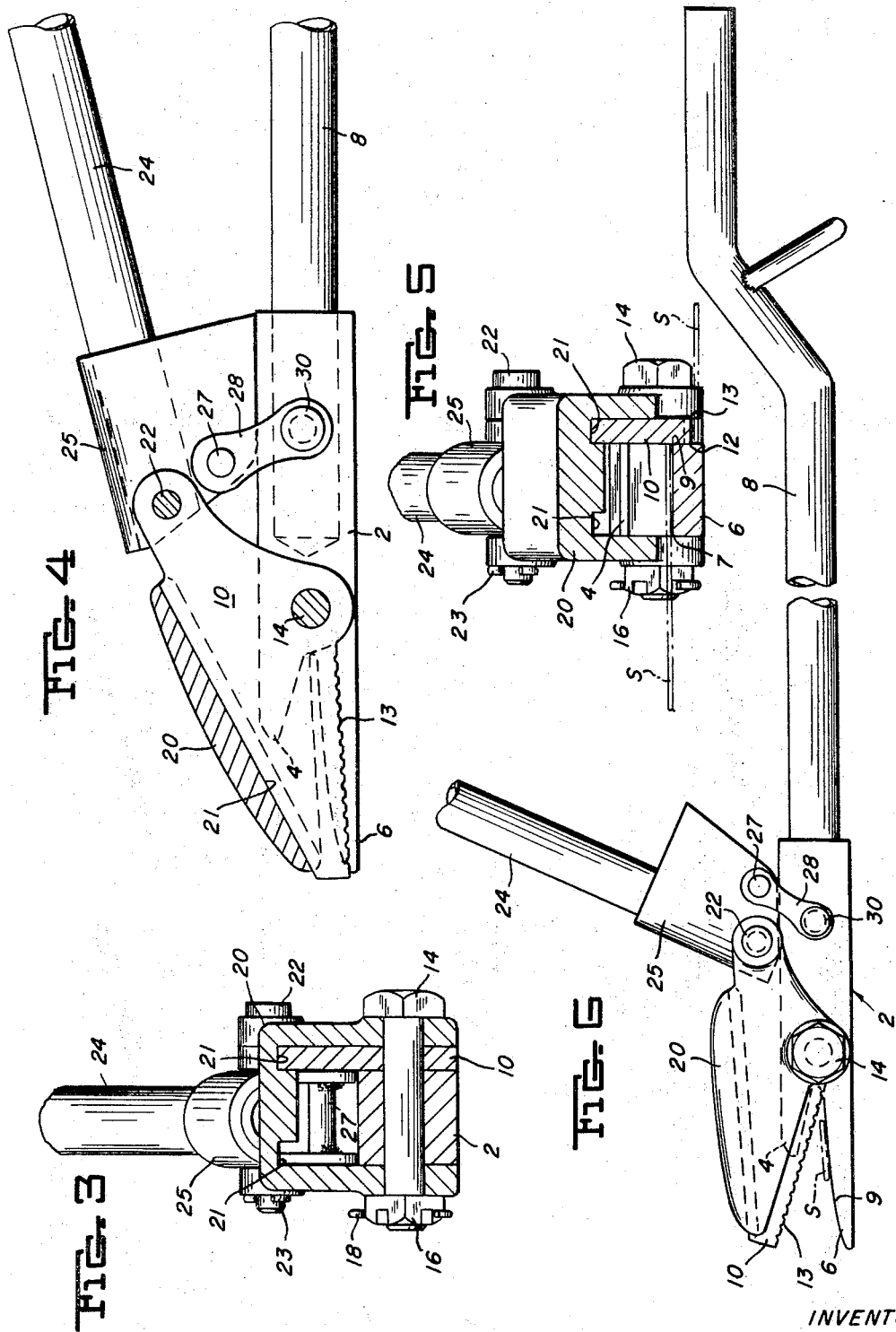

3,339,280
STRAP CUTTER
Marchand B. Hall, Olympia Fields, Ill., assignor to United States Steel Corporation, a corporation of Delaware
Filed Aug. 4, 1965, Ser. No. 477,161
2 Claims. (Cl. 30—251)

ABSTRACT OF THE DISCLOSURE

A strap cutter having a fixed jaw with a lateral cutting edge, and a hood pivotally connected with the fixed jaw and having a shear blade rigidly connected therewith for cooperation with the lateral cutting edge of the fixed jaw. A handle is provided on the hood and is pivotally connected with the fixed jaw whereby the hood can be manipulated to effect pivotal movement of the shear blade to cooperate with the lateral cutting edge of the jaw.

---

The present invention relates generally to a metal cutting tool and more particularly has as its primary object the provision of an improved metal-strap cutting tool having a movable shear blade and a stationary cutting jaw arranged in a unique manner so as to eliminate separation or spreading of the shear blade from the cutting jaw during a strap cutting operation.

The above and other objects will become more apparent after referring to the following specification and attached drawings, in which:

FIGURE 1 is a side elevational view showing the device of the invention in closed position;
FIGURE 2 is a plan view of FIGURE 1;
FIGURE 3 is a cross-sectional view taken substantially along the line III—III of FIGURE 1;
FIGURE 4 is a partial longitudinal sectional view taken substantially along the line IV—IV of FIGURE 2;
FIGURE 5 is a cross-sectional view taken along the line V—V of FIGURE 1 with the sheared strap shown in chain lines; and
FIGURE 6 is a view similar to FIGURE 1 but showing the device of the invention in open position.

Referring more particularly to the drawings, reference numeral 2 designates generally the stationary cutting jaw of the invention which, as best shown in FIGURE 4, is provided with an upper lip projection 4 and a relatively longer lower lip projection 6. As will become apparent, the lateral upper edges 7 and 9 of the lower lip projection 6 serve as cutting edges. A handle 8 is rigidly connected with and projects axially from the end of the stationary jaw 2 remote from the lips 4 and 6.

A shear blade 10 having cutting edges 12 and 13 is pivotally connected with the stationary jaw 2 in side-by-side relation therewith by means of a bolt 14, which has a threaded end portion for accommodating a locking nut 16. A cotter pin 18 secures the nut 16 to the bolt 14.

A hood 20 which is substantially channel shape in section is telescoped over the shear blade 10 and the jaw 2 and is pivotally mounted relative to the jaw 2 by means of the bolt 14. The hood 20 is provided with a pair of parallel grooves 21 in its web portion, one of which, depending on which side of the jaw 2 the blade 10 is disposed, serves to accommodate the upper portion of the shear blade when the hood is telescoped over the blade and jaw. A pin 22 secured by a cotter pin 23 pivotally connects the shear blade 10 to the rearward end of the hood 20. The pin 22 also serves to connect a handle 24 with the hood 20. A U-shape bracket 25 is welded to the handle. A pin 27 is disposed transversely in the bracket 25 and has ends projecting from opposite sides of the bracket for receiving one end of each of a pair of links 28. The lower ends of the links 28 are pivotally disposed on opposite sides of the jaw 2 and pivotally connected therewith by a pivot pin 30 secured by a cotter pin 31. Links 28 effect simultaneous pivotal movement of the hood 20 and shear blade 10 relative to the jaw 2 and the cutting edge 9 of the lower lip projection 6.

The hood 20 restrained by the upper lip 4 of the jaw 2 functions to laterally confine the blade 10 and the jaw 2 so as to prevent spreading of the shear blade 10 from the cutting edge 9 of the lower lip projection 6 when the shear blade is pivoted relative to the jaw 2 in a cutting operation. This insures that the cutter will cut cleanly and accurately each time the tool is used.

In operation, to cut a length of strapping S, the handle 24 is moved away from the handle 8 so as to pivot the cutting edge 12 of the shear blade 10 away from the cutting edge 9 of the lower lip projection 6 and open the tool. The tool is then positioned with the lower lip projection 6 underlying the strip S and the cutting edge 12 of the shear blade 10 overlying the strap. Then, to complete the cutting operation, the handle 24 is moved toward the handle 8. This causes the cutting edge 12 of the shear blade 10 to shear the strap along the cutting edge 9 of the lower lip projection 6. During the shearing action the hood 20 restrained laterally by the upper lip 4 resists any tendency for the blade 10 to spread laterally relative to the lower lip projection 6.

It will be noted that when the cutting edge 9 of the lower lip projection 6 and the cutting edge 12 of the blade become worn, the tool may be disassembled and then reassembled with the cutting edge 13 of the shear blade 10 positioned adjacent the cutting edge 7.

While I have shown but one embodiment of my invention, it will be apparent that other adaptations and modifications may be made without departing from the scope of the following claims.

I claim:
1. A strap cutter comprising a stationary jaw having a lateral cutting edge, a handle connected with said stationary jaw, a shear blade having a cutting edge portion pivotally connected with said stationary jaw in side-by-side relation therewith, said shear blade normally extending along said lateral cuttting edge and being pivotal toward and away from said lateral cutting edge to effect a cooperative shearing action therewith, a hood of substantially channel section pivotally connected with said jaw and telescoped snugly over said jaw and said shear blade to laterally confine the jaw and blade, said cutting edge portion of said shear blade projecting below said hood, said hood being rigidly connected with one end of said shear blade for pivotal movement therewith relative to said jaw, a handle pivotally connected with said hood, and linkage means connecting said hood handle with said jaw whereby movement of said hood handle relative to said stationary jaw effects pivotal movement of said shear blade relative to said lateral cutting edge.

2. A strap cutter comprising a stationary jaw having a lateral cutting edge on each of two opposed sides thereof, a handle connected with said stationary jaw, a shear blade having a cutting edge portion on each of two opposed sides thereof pivotally connected with said stationary jaw in side-by-side relation therewith, said shear blade normally disposed with one cutting edge thereof extending along one of said lateral cutting edges and being pivotal toward and away from said one of said lateral cutting edges to effect a cooperative shearing action therewith, a hood of substantially channel section pivotally connected with said jaw and telescoped snugly over said jaw and said shear blade to laterally confine the jaw and blade, said cutting edge portions of said blade projecting below said hood, said hood being rigidly connected with one end of said shear blade for pivotal movement therewith relative to said jaw, a handle pivotally connected with said hood, and linkage means connecting said hood handle with said jaw whereby movement of said hood handle relative to said stationary jaw effects pivotal movement of said shear blade relative to said one of said lateral cutting edges.

References Cited

UNITED STATES PATENTS 2,455,009  11/1948  Hood _____ 30—251

WILLIAM FELDMAN, *Primary Examiner.*

J. C. PETERS, *Assistant Examiner.*